(12) United States Patent
Forde et al.

(10) Patent No.: US 10,409,948 B1
(45) Date of Patent: Sep. 10, 2019

(54) TOPOLOGY PRESERVING SCHEMATIC TRANSFORMATIONS FOR RF NET EDITING

(71) Applicant: Cadence Design Systems, Inc., San Jose, CA (US)

(72) Inventors: Nicholas Forde, Edinburgh (GB); Monika Ravi Kalarickel, Livingston (GB); Zsolt Haag, Livingston (GB)

(73) Assignee: CADENCE DESIGN SYSTEMS, INC., San Jose, CA (US)

(*) Notice: Subject to any disclaimer, the term of this patent is extended or adjusted under 35 U.S.C. 154(b) by 40 days.

(21) Appl. No.: 15/721,292

(22) Filed: Sep. 29, 2017

(51) Int. Cl.
*G06F 17/50* (2006.01)

(52) U.S. Cl.
CPC .............................. *G06F 17/5081* (2013.01)

(58) Field of Classification Search
USPC ......................................................... 716/139
See application file for complete search history.

(56) References Cited

U.S. PATENT DOCUMENTS

| | | | | |
|---|---|---|---|---|
| 2002/0014533 | A1* | 2/2002 | Zhu | B82Y 15/00 235/472.01 |
| 2009/0326873 | A1* | 12/2009 | Wang | G06F 17/505 703/1 |
| 2016/0178351 | A1* | 6/2016 | Amit | G01N 21/9501 356/243.1 |
| 2017/0249416 | A1* | 8/2017 | Sendig | G06F 17/5077 |
| 2018/0106607 | A1* | 4/2018 | Umemura | G01B 11/24 |

* cited by examiner

*Primary Examiner* — Mohammed Alam
(74) *Attorney, Agent, or Firm* — Foley & Lardner LLP (57) ABSTRACT

The present embodiments relate to reconfiguration of a schematic. According to some aspects, embodiments relate to a method in which a schematic of a circuit is displayed on a graphical user interface of a computing device. The schematic can include a plurality of circuit objects, and at least one interconnect connecting the plurality of circuit objects to define a circuit connectivity. The method further includes defining a schematic reference point on the schematic. The method also includes determining a distance of each circuit object of the plurality of circuit objects from the schematic reference point. The method also includes increasing the distance of each circuit object of the plurality of circuit objects from the schematic reference point relative to a respective size of each circuit object, wherein increasing the distance includes multiplying the distance by a scaling factor. The at least one interconnect is reconfigured to maintain circuit connectivity.

20 Claims, 9 Drawing Sheets

Figure 3 algorithm circuit object reference point is
  input: list $P$ of all terminals with attached interconnects,
    center point $P_M$ of circuit object bounding box
  output: circuit object reference point
  local: candidate points $P_A$, $P_B$, $P_I$, $P_R$ if empty($P$) return $P_M$
  if unary($P$) return front($P$)

$P_A$ := point in $P$ furthest from $P_M$
  $P_B$ := (point in $P$ not orthogonal to $P_A$ and nearest to $P_M$) or
    (point in $P$ nearest to $P_M$)
  $P_I$ := point in intersections of orthogonal lines through $P_A$ and $P_B$ nearest to $P_M$
  $P_R$ := point in [$P_A$, $P_B$, $P_I$] nearest to $P_M$ if $P_R$ is orthogonal to all points in $P$ return $P_R$
  return $P_M$

TOPOLOGY PRESERVING SCHEMATIC TRANSFORMATIONS FOR RF NET EDITING

TECHNICAL FIELD

The present disclosure relates generally to integrated circuits, and more particularly to methods and apparatuses for implementing designs of integrated circuits in processes that include design rules.

BACKGROUND

Electronic design automation (EDA) tools are used to design integrated circuits. Integrated circuits can include many thousands and perhaps millions of circuit elements (e.g., transistors, logic gates, diodes) and interconnecting wires and busses. The circuit elements and wires can be formed on many different layers, with various interconnections (e.g., vias) between layers. EDA tools allow a designer to describe an integrated circuit based on its desired behavior on a schematic, and then transform that schematic into a set of geometric shapes called a layout which forms the circuit elements and wires for all the different layers.

SUMMARY

The present embodiments relate to reconfiguration of a schematic. According to some aspects, embodiments relate to a method in which a schematic of a circuit is displayed on a graphical user interface of a computing device. The schematic can include a plurality of circuit objects, and at least one interconnect connecting the plurality of circuit objects to define a circuit connectivity. The method further includes defining a schematic reference point on the schematic. The method also includes determining a distance of each circuit object of the plurality of circuit objects from the schematic reference point. The method also includes increasing the distance of each circuit object of the plurality of circuit objects from the schematic reference point relative to a respective size of each circuit object, wherein increasing the distance includes multiplying the distance by a scaling factor. The at least one interconnect can be reconfigured to maintain the circuit connectivity.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

A schematic can be an arrangement of circuit symbols or circuit cells that describe an integrated circuit. An EDA tool can provide a schematic editor on a graphical user interface (GUI), using which a circuit designer can design a schematic of a circuit using circuit objects that represent circuit elements, such as, resistors, capacitors, inductors, transistors, etc. The circuit objects can be selected from a library of circuit objects used by or provided by the EDA tool. The circuit designer can place the selected circuit objects in the schematic in a desired arrangement to design the circuit. The circuit objects also can be interconnected using symbols that represent wires or interconnects. The interconnects can be used, for example, to connect output ports to input ports of circuit objects.

During the design of the schematic, the EDA tool can allow one or more additional circuit objects for placement on the schematic. However, in some instances, sizes of the additional circuit objects may be too large to fit between other circuit objects or interconnects already present on the schematic. In some such instances, and in accordance with inventive concepts disclosed herein, the EDA tool can provide an "inflate" feature, which if invoked, can increase a distance between circuit objects on the schematic such that the additional circuit objects can be accommodated within the schematic. In one approach, the EDA tool can select a point of reference on the schematic, and increase a distance of each circuit object from the point of reference while maintaining the respective sizes of the circuit objects and maintaining the relative distances between the circuit objects. This results in an increase in the distance between any two circuit objects, thereby providing more space to accommodate additional circuit objects.

Figure 1:
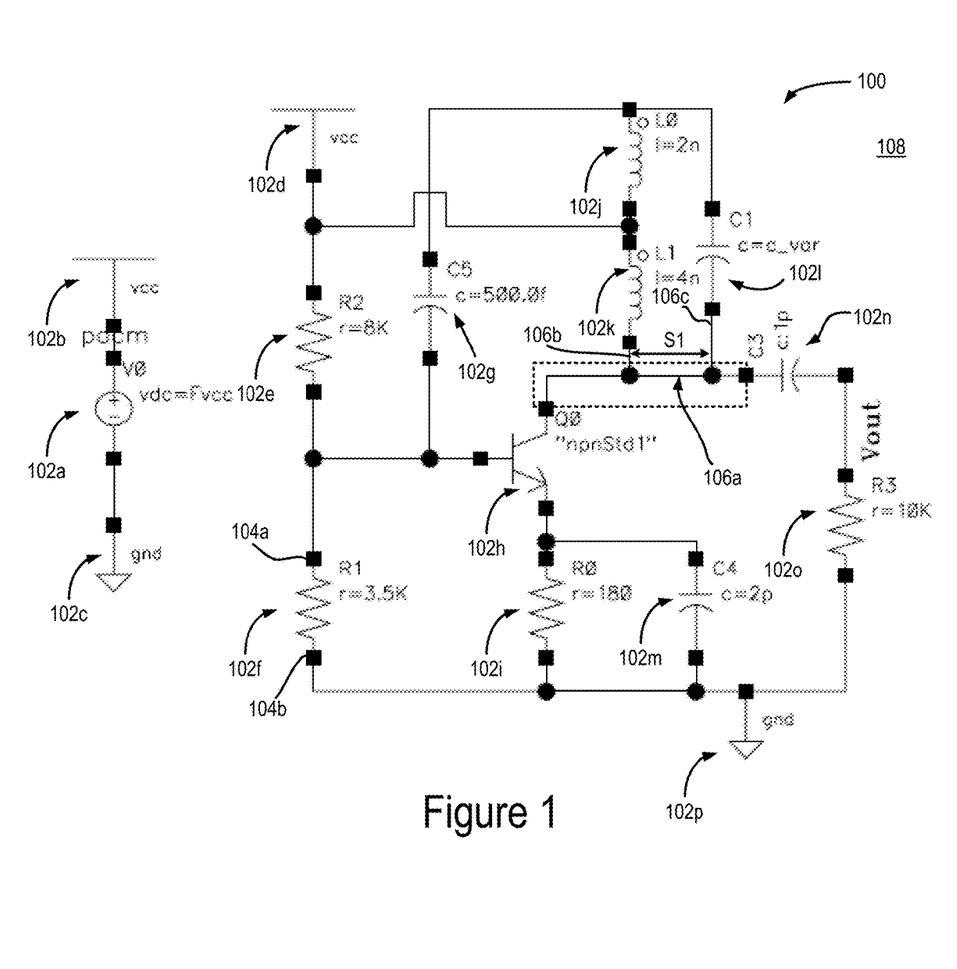
FIG. 1 illustrates a representation of a first example schematic according to present embodiments.

FIG. 1 illustrates a representation of a first example schematic 100. In particular, FIG. 1 may illustrate a portion of a GUI on which the first example schematic 100 is displayed. The first example schematic 100 can include several circuit objects: dc-supply 102a, a first VCC supply 102b, a first ground 102c, a second VCC supply 102d, resistor R2 102e, resistor R1 102f, capacitor C5 102g, transistor Q0 102h, resistor R0 102i, inductor L0 102j, inductor L1 102k, capacitor C1 102l, capacitor C4 102m, capacitor C3 102n, resistor R3 102o, and a second ground 102p (these circuit objects are collectively referred to as "the circuit objects 102," hereinafter). Each of the circuit objects 102 include one or more terminals, to which interconnects can be connected. For example, a first R1 terminal 104a and a second R1 terminal 104b of the resistor R1 102f are shown in FIG. 1. Other circuit objects 102 have similar terminals. The schematic 100 further includes interconnects that extend between one or more terminals of the circuit objects 102. For example, a first interconnect 106a extends between the terminals of the transistor Q0 102h and capacitor C3 102n, a second interconnect 106b extends between a terminal of the inductor L1 102k and the first interconnect 106a, and a third interconnect 106c extends between a terminal of the capacitor C1 102l and the first interconnect 106a. Similar interconnects are shown extending between various circuit objects 102 to define the connectivity of the circuit represented by the schematic 100. The circuit objects 102 and the interconnects are positioned on a schematic grid or a canvas 108. The schematic grid 108 can be a two dimensional grid on which circuit objects 102 and interconnects can be arranged to form the schematic 100. The schematic grid 108 can be a feature of the EDA tool that allows a designer to select circuit objects from a circuit object library for placement on the schematic grid 108.

In some instances, a circuit designer using the EDA tool may desire to add one or more additional circuit objects to the schematic 100. The additional circuit objects can include circuit objects that represent various electrical components, such as resistors, capacitors, inductors, transistors, diodes, power supplies, radio-frequency circuit components, and the like. This may involve the circuit designer selecting the desired additional circuit objects from the circuit object library, placing the additional circuit object onto the schematic 100 at the desired location, and placing interconnects to connect the terminals of an additional circuit object and one or more circuit objects 102 on the schematic 100. In some instances, as mentioned above, the size of the additional circuit object may be too large to fit between other circuit objects. For example, suppose the first interconnect 106a is to be replaced with an additional circuit object. However, for instance, the space S1 between the second interconnect 106b and the third interconnect 106c may be insufficient to accommodate the additional circuit object. One approach to making space for the additional circuit object could be for the circuit designer to reorganize the circuit objects 102 by removing or moving the circuit objects around the first, second, and third interconnects 106a, 106b, and 106c such that there is enough space to place the additional circuit object as well as any additional interconnects for connecting the additional circuit objects to the existing circuit objects 102 on the schematic 100. But this approach can be time consuming due to the possibility of performing multiple steps of re-organizing and reconnecting the circuit objects 102 and the interconnects. As discussed below, the EDA tool can provide an "inflate" feature, which when selected by the circuit designer, increases the distances between the circuit objects 102 of the schematic 100 such that additional circuit objects can be accommodated. The distances between the circuit objects 102 are increased without increasing the sizes of the circuit objects 102 themselves, for instance.

Figure 2:
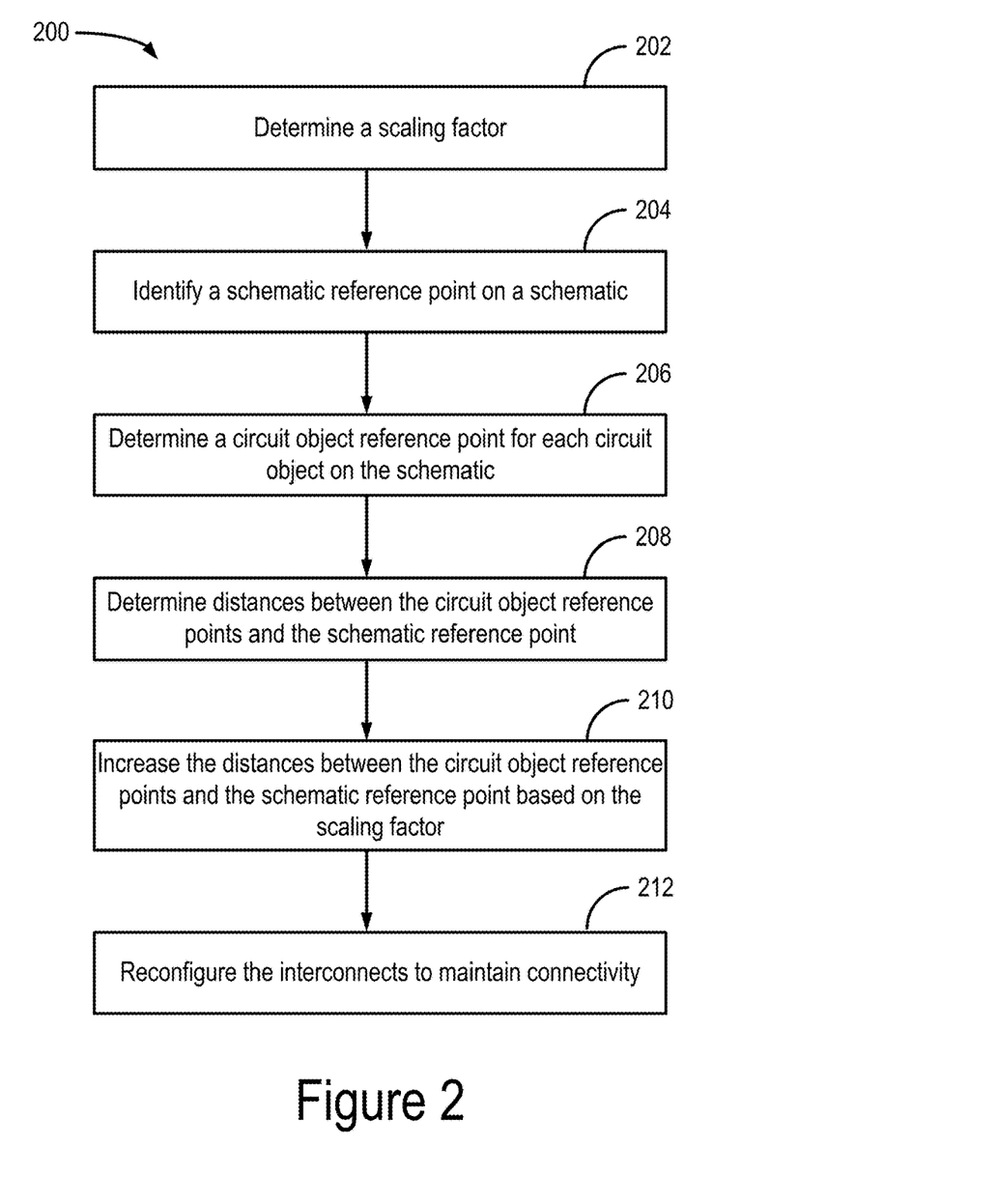
FIG. 2 shows a flow diagram of a process for reconfiguring a schematic according to the present embodiments.

FIG. 2 shows a flow diagram of a process 200 for reconfiguring a schematic. In particular, the process 200 can be used to reconfigure a schematic, such as the first example schematic 100 shown in FIG. 1, to increase the spacing between circuit objects 102. The process 200 includes determining a scaling factor (stage 202). The scaling factor can be a number which can denote the degree to which the schematic is to be scaled. For example, the scaling factor can be a number between 1 and 100. As discussed below, the scaling factor can be used to scale the distances between a schematic reference point and the circuit objects 102. In some implementations, the EDA tool can allow the user to select the scaling factor. In some other implementations, the EDA tool can determine the scaling factor based on the size of the additional circuit object to be added to the schematic 100 and the current distance between circuit objects 102 or interconnects at the location where the additional circuit object is to be added. The EDA tool can enable the user to identify the location on the schematic 100 where the additional circuit objects are to be added. Based on this information, the EDA tool can determine the amount of scaling needed to increase the distances between the circuit objects 102 at the identified location such that the additional circuit objects and any corresponding interconnects can be accommodated.

Figure 3:
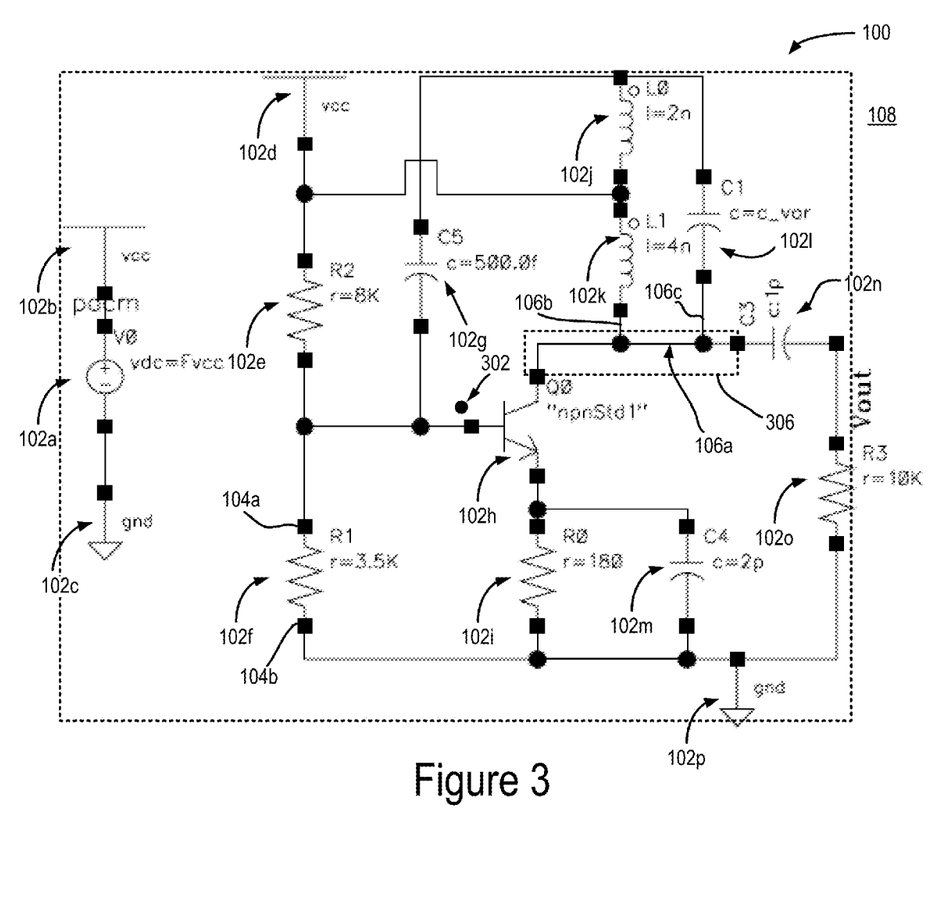
FIG. 3 illustrates an example location of a schematic reference point in the schematic shown in FIG. 1.

The process 200 further includes identifying a schematic reference point on the schematic (stage 204). The schematic reference point can be located anywhere on the schematic grid 108. FIG. 3 illustrates an example location of a schematic reference point 302 in the schematic shown in FIG. 1. In this example, the schematic reference point 302 can be located at a center of the schematic 100. In one example implementation, a center of the schematic 100 can be determined by determining a bounding box 304 around the schematic, such that the bounding box 304 represents the smallest rectangle that encloses all of the circuit objects 102 and interconnects in the schematic 100, and selecting a center of the bounding box 304 as the schematic reference point 302. In some other implementations, other regular or irregular polygons can be used instead of the rectangular bounding box 304, and the centers of the polygon can be selected as a schematic reference point 302. In yet another implementations, the schematic reference point 302 can be located outside of the bounding box 304. In some implementations, the schematic reference point 302 can be located on or in close proximity to the location on the schematic 100 where additional components are to be added. For example, a rectangle 306 can define a region in the schematic 100 where additional circuit objects are to be added. The schematic reference point 302 can be selected anywhere within the rectangle 306. For example, the schematic reference point 302 can be located at a center of the rectangle 306. The schematic reference point 302 can have coordinates defined on the schematic grid 108. In some example implementations, the schematic reference point 302 can have Cartesian coordinates ($x_{srp}$, $y_{srp}$) in the plane of the schematic grid 108. In some implementations, the schematic reference point 302 can have polar coordinates ($r_{srp}$, $\varphi_{srp}$) in the plane of the schematic grid 108. In some implementations, where the position of the schematic reference point 302 is selected to be within the rectangle 306, the EDA tool can set the scaling factor to be based on the size of the additional circuit object to be added to the schematic 100 and the current distance between circuit objects 102 or interconnects at the location where the additional circuit object is to be added.

Figure 4:
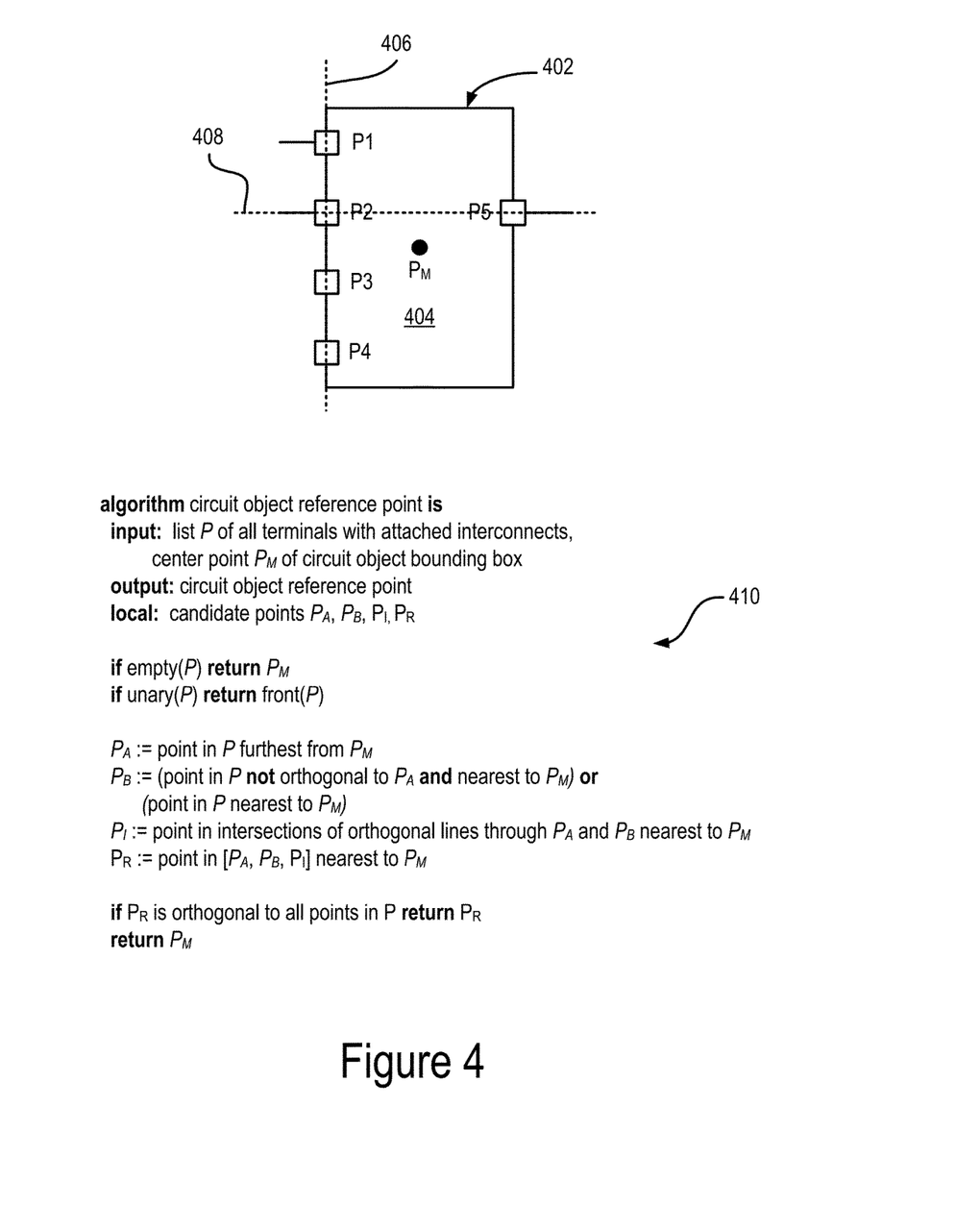
FIG. 4 illustrates one example technique for determining a circuit object reference point, according to the present embodiments.

The process 200 also includes determining a circuit object reference point for each circuit object on the schematic (stage 206). The circuit object reference point can be a point on the circuit object from which a distance of the circuit object from the schematic reference point 302 is measured. In some implementations, the EDA tool can select any point within the boundary of the circuit object 102 as a location for the circuit object reference point of that circuit object 102. FIG. 4 illustrates one example technique for determining the circuit object reference point. In particular, FIG. 4 shows a circuit object bounding box 402 that forms a boundary of a circuit object 404. The circuit object includes five terminals: P1, P2, P3, P4, and P5, of which terminals P1, P2 and P5 are connected to interconnects. In some implementations, the EDA tool can select the location of any one of the five terminals as a location for the circuit object reference point. A center point $P_M$ can be defined that forms a center of the circuit object bounding box 402. In some implementations, the center point $P_M$ can be selected as a location of the circuit object reference point. In some implementations, any one of only those terminals that have interconnects connected to them can be selected as a location for the circuit object reference point. That is, in reference to the example circuit object 404 shown in FIG. 4, any one of the terminals P1, P2 and P5 may be selected as the location of the circuit object reference point.

In some implementations, the EDA tool may utilize an example algorithm 410 "circuit object reference point" shown in FIG. 4 for determining the location of the circuit object reference point. Using the algorithm 410, the EDA tool can select the location of one of only those terminals that are connected to interconnects. The algorithm 410 accepts as input a list of terminals with attached interconnects. For example, referring to the circuit object 404, the list can include terminals P1, P2, and P5. If there are no terminals that have interconnects attached to them, then the algorithm 410 selects the center point $P_M$ as the circuit object reference point. The algorithm 410 also defines four candidate points $P_A$, $P_B$, $P_I$, and $P_M$. Candidate point $P_A$ corresponds to the terminals in the list that is the farthest from the center point $P_M$. In the example circuit object 404, $P_A$ corresponds to terminal P1. $P_B$ corresponds to a terminal in the list that is not orthogonal to $P_A$ and is nearest to $P_M$ or a terminal in the list that is nearest to $P_M$. In the example circuit object 404, $P_B$ corresponds to the terminal P5. $P_I$ corresponds to the terminal in the list that is at an intersection of a first line 406 passing through the $P_A$ and a second line 408, which is orthogonal to the first line 406, and passes through $P_B$. In the example circuit object 404, $P_I$ corresponds to terminal P2. $P_R$ corresponds to one of $P_A$, $P_B$, and $P_I$ that is nearest to $P_M$. Further, the algorithm 410 returns $P_R$ as the circuit object reference point if $P_R$ is orthogonal to all terminals in the list. In the example circuit object 404, $P_R$ corresponds to $P_B$, e.g., terminal P2, which is orthogonal to both P5 and P1. Thus, the algorithm 410 returns the location of terminal P2 as the circuit object reference point. If however, $P_R$ does not exist for a particular circuit object, the algorithm 410 returns the location of the center point $P_M$ as the location of the circuit object reference point. Using the algorithm 410 allows selection of a terminal for the circuit object reference point that minimizes the risk of jogs (or "z" shaped interconnect portions) being created when connecting end points of interconnects to the terminals of the circuit object. The inflate process can inflate the schematic, while, in part, maintaining the sizes of the circuit objects themselves. This can result in gaps between the inflated interconnects and the terminals of the circuit objects. By selecting the reference point in the manner discussed above, the risk of creating jogs can be minimized. Using the algorithm 410 also allows selection of a terminal for the circuit object reference point that minimizes the risk of a terminal of the circuit object 404 not being aligned with the schematic grid 108 after the circuit object 404 is repositioned. In some implementations, the circuit object reference point determined using any one of the techniques discussed above can, similar to the schematic reference point 302, be represented using Cartesian ($x_{corp}$, $y_{corp}$) or polar coordinates ($r_{corp}$, $\varphi_{corp}$).

Figure 5:
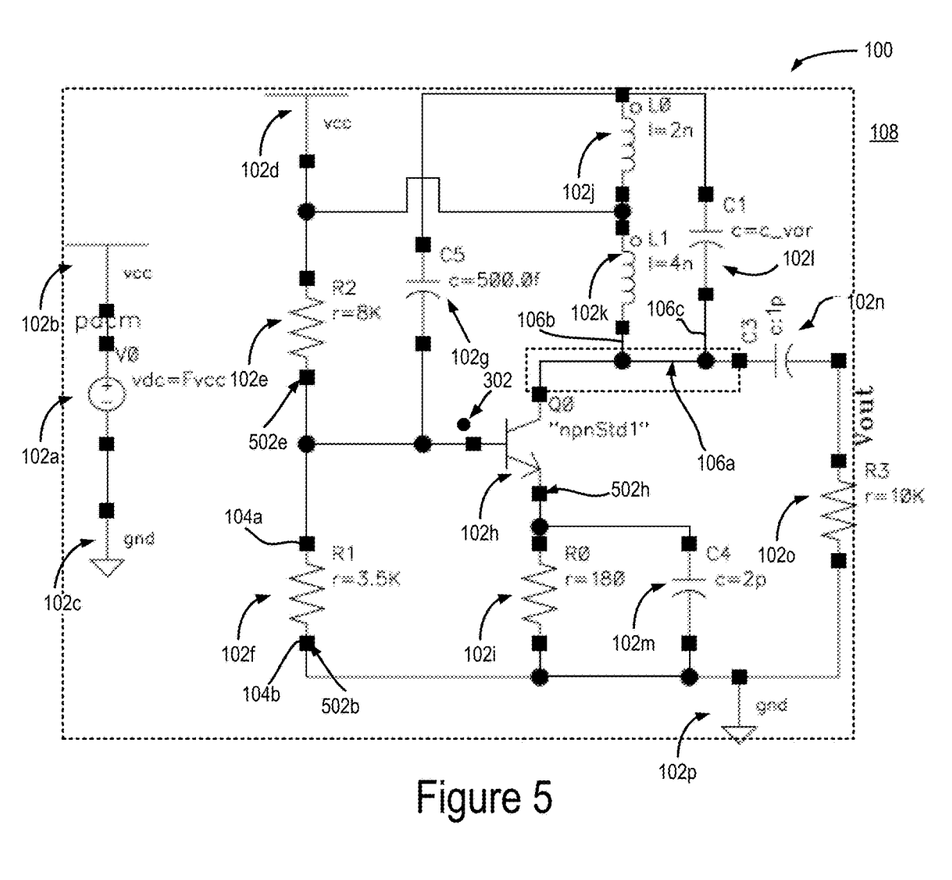
FIG. 5 illustrates an example schematic with location(s) of a circuit object reference point for selected circuit objects according to the present embodiments.

FIG. 5 illustrates an example schematic 100 with locations of the circuit object reference points for selected circuit objects. For example, the location of the second R1 terminal 104b is selected as the resistor R1 reference point 502b ($x_{R1rp}$, $y_{R1rp}$). Similarly, the location of the lower of the two terminals of the resistor R2 102e is selected as resistor R2 reference point 502e ($x_{R2rp}$, $y_{R2rp}$). Further, the location of the emitter terminal of the transistor Q0 102h is selected as the transistor Q0 reference point 502h ($x_{Q0rp}$, $y_{Q0rp}$). It is noted that a location of any one of the other terminals of each of the resistor R1 102f, resistor R2 102e, and the transistor Q0 102h, could also be selected as a reference point. Circuit object reference points for the other circuit objects 102 can be similarly selected.

Figure 6:
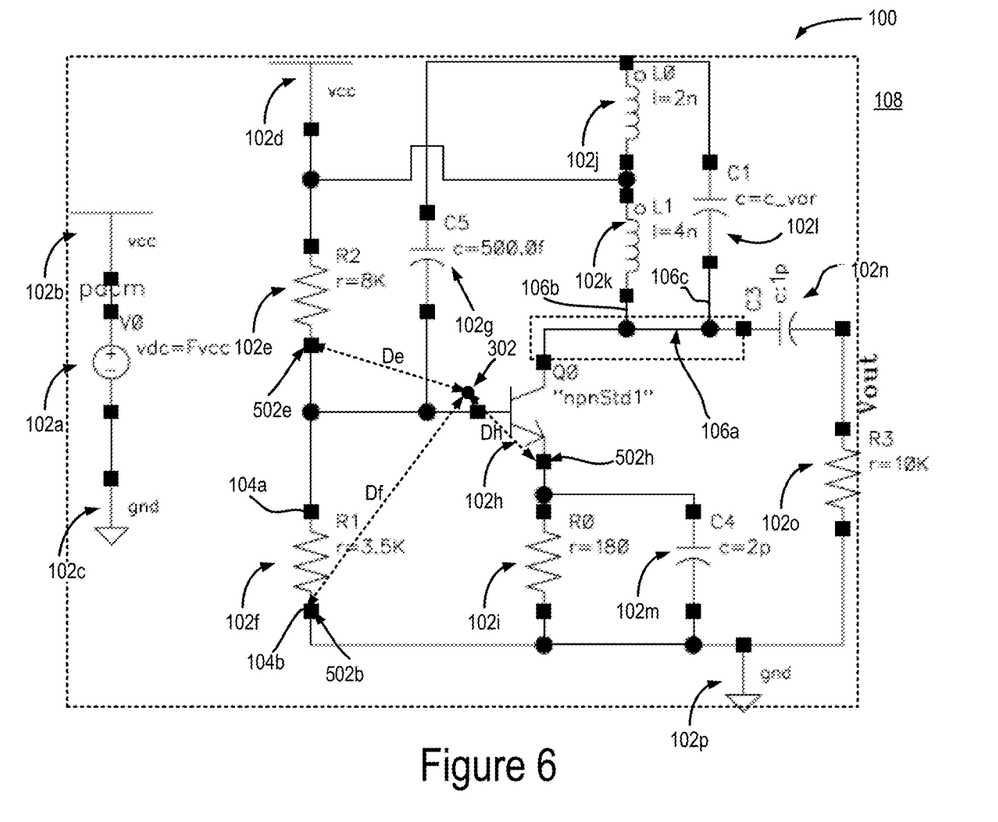
FIG. 6 illustrates an example schematic with distances between a schematic reference point and circuit object reference points according to the present embodiment.

Referring again to FIG. 2, the process 200 further includes determining distances between the circuit object reference points and the schematic reference point (stage 208). FIG. 6 illustrates an example schematic 100 with distances between the schematic reference point and the circuit object reference points. The EDA tool can determine a distance $D_e$ between the resistor R2 reference point 502e and the schematic reference point 302, a distance $D_f$ between the resistor R1 reference point 502f and the schematic reference point 302, and a distance $D_h$ between the transistor Q0 reference point 502h and the schematic reference point 302. The EDA tool can similarly determine the distances of the circuit object reference points of each circuit object from the schematic reference point 302.

The process 200 also includes increasing the distance between the circuit object reference points and the schematic reference point according to, or based on the scaling factor (stage 210). In some implementations, the EDA tool can increase the distances, such as the distances $D_e$, $D_f$, and $D_h$, between the schematic reference point and the respective circuit objects to $D'_e$, $D'_f$ and $D'_h$, respectively, by multiplying these distances with the scaling factor M, for instance. By maintaining the orientation of each of the circuit object reference points with respect to the schematic reference point 302, the EDA tool can determine the new coordinates of the circuit objects. Alternatively, the EDA tool can determine the new coordinates of the circuit objects by transforming the current coordinates of the circuit object reference points using the scaling factor M and the coordinates of the schematic reference point 302. For example, new coordinate ($x'_{R1rp}$, $y'_{R1rp}$) of the resistor R1 reference point 502b can be equal to (($x_{R1rp} \times M$)−$x_{scr}$), ($y_{R1ip} \times M$)−$x_{scr}$). The EDA tool can similarly determine the new coordinates ($x'_{R2rp}$, $y'_{R2rp}$) of the resistor R2 reference point

502e, the new coordinates ($x'_{Q0rp}$, $y'_{Q0rp}$) of the transistor Q0 reference point 502h, and the new coordinates of all the circuit objects 102 in the schematic 100. In some implementations, the EDA tool may further alter the new coordinates of the circuit objects such that the new coordinates lie on an existing point in the schematic grid 108. In particular, the mathematical operations on the current coordinates of the circuit objects to produce the new coordinates can result in the new coordinates having values that lie between two existing points on the schematic grid 108. In such instances, the EDA tool can adjust the new coordinates to be equal to the nearest point on the schematic grid 108.

It should be noted that while the circuit objects 102 are relocated to respective new coordinates, the sizes of the circuit objects 102 themselves are not changed. In other words, the sizes of bounding boxes associated with each circuit object 102 (such as, for example, the bounding box 402 shown in FIG. 4) do not change after the relocation of the circuit objects 102. Thus, the distances between the circuit objects 102 and the schematic reference point 302 can increase in relation to the respective sizes of the circuit objects 102. As the distances are scaled using a multiplication factor, the distances between any two circuit objects also increases. Again, this increase is in the distances between the circuit objects 102 while the sizes of the circuit objects 102 themselves remains the same.

The process may additionally include reconfiguring the interconnects to maintain connectivity of the schematic (stage 212). As discussed above, the EDA tool can determine new coordinates for each of the circuit objects 102 in the schematic 100. The EDA tool, in a similar manner, can determine new coordinates of each of the interconnects in the schematic 100 based on the scaling factor M and the coordinates of the schematic reference point. That is, the EDA tool can select a reference point on each interconnect and determine its new coordinates. Once the new coordinates of the interconnects are determined, the EDA tool can extend the lengths of the interconnects as needed to reconnect the interconnects to the circuit objects 102 or other interconnects to maintain the same connectivity. In one example implementation, the EDA tool can determine new coordinates for each point in an interconnect, as opposed to a single reference point, in a manner similar to that discussed above in relation to the circuit object reference points. Each interconnect in the schematic 100 has a set of points associated with it that define the shape and size of the interconnect. Transforming each point in an interconnect to its new coordinate essentially moves the interconnect to its new location. The EDA tool can then extend the length of the interconnect to maintain connectivity, for instance.

Figure 7:
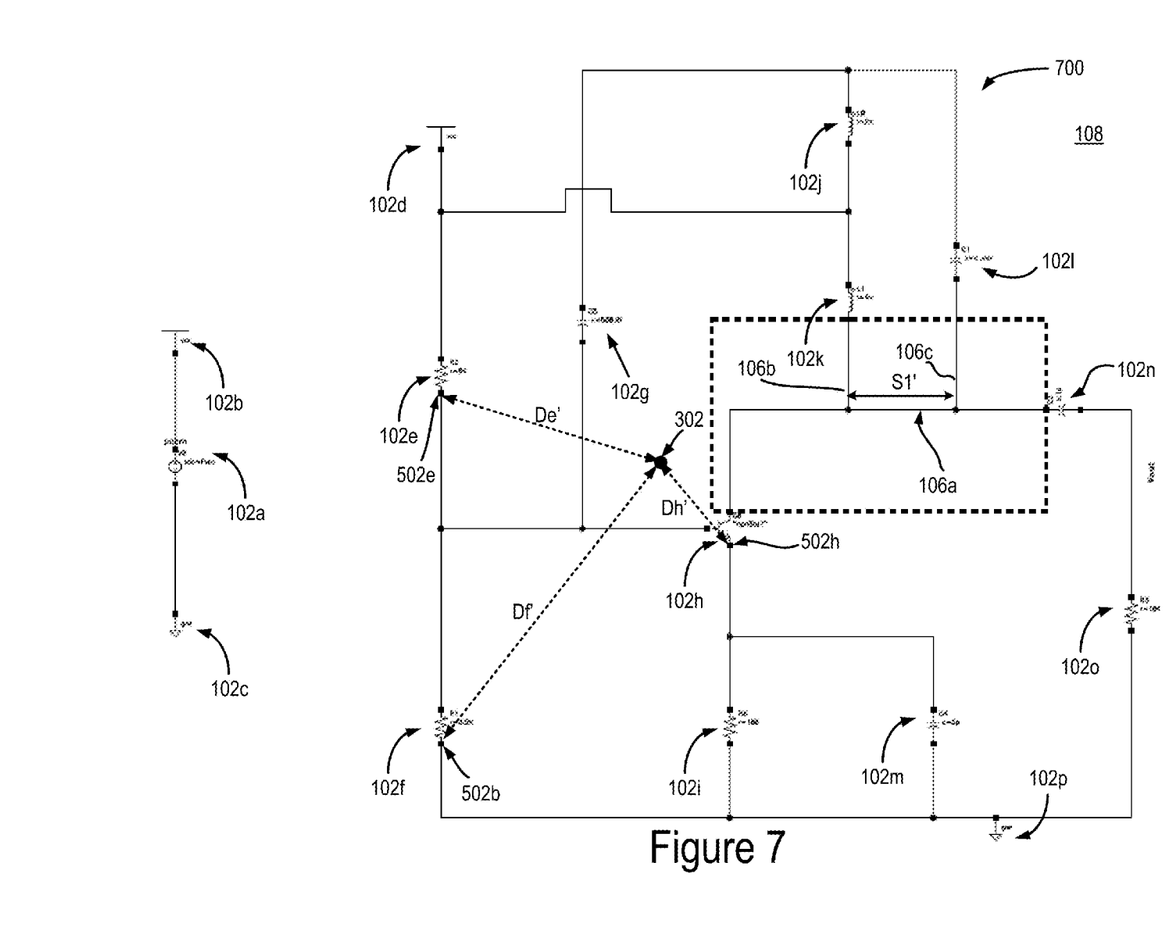
FIG. 7 illustrates a schematic resulting from an inflate process discussed in relation to FIG. 2.

FIG. 7 illustrates a schematic 700 resulting from the inflate process discussed above in relation to FIG. 2. The schematic 700 shows the new increased distances $D'_e$, $D'_f$, and $D'_h$, of the R2 reference point 502e, the R1 reference point 502f, and the Q0 reference point 502h from the schematic reference point 302. Similarly, distances of circuit object reference points (not shown) of the other circuit objects 102 in the schematic 100 from the schematic reference point 302 are also increased. This increase in the distances between the circuit objects 102 and the schematic reference point 302 results in an increase in the distances or spacing between individual circuit objects and interconnects in the schematic 100. This increased spacing between individual circuit objects can allow additional space to accommodate additional circuit object(s) to the schematic. For example, the spacing S1 (FIG. 1) between the second interconnect 106b and the third interconnect 106c increases to S1'. This increased spacing can allow replacing the first interconnect 106a between the second interconnect 106b and the third interconnect 106c with an additional circuit object. The inflate process 200 also can maintain the relative positions of each circuit object with respect to other circuit objects. That is, for example, a circuit object on the left and above another circuit object in the original schematic 100 can also appear on the left and above the another circuit object in the inflated schematic 700.

As discussed above, the EDA tool can initiate the process 200 for inflating the schematic 100 based on an indication by the user, such as, for example, by the user pressing a button, or selecting the inflate option from a pull down menu on the GUI. Multiple activation of the inflate option can initiate the process a corresponding number of times, thereby increasing the separation between circuit objects a corresponding number of times, e.g., using a same scaling factor or different scaling factors. Alternatively, the EDA tool can automatically initiate the inflate process 200 if it is determined that a size or dimension of an additional circuit object is greater than the corresponding size or dimension of an interconnect or the portion of the interconnect that is to be replaced with the additional circuit objet.

Figure 8:
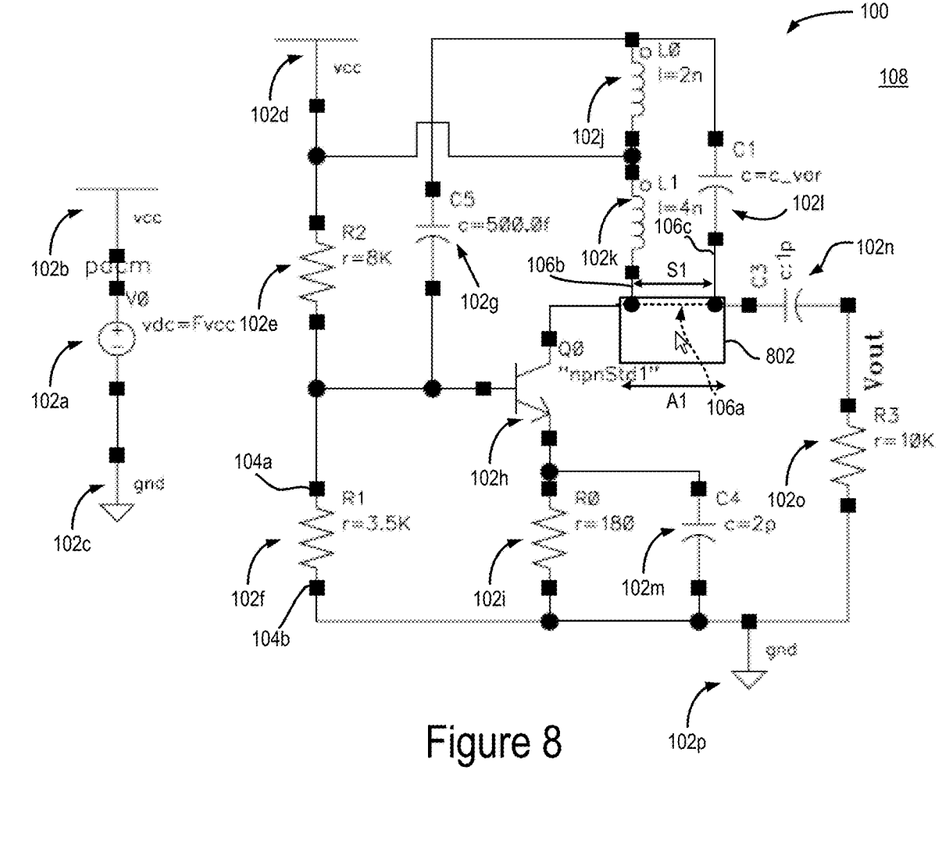
FIG. 8 illustrates a scenario where an additional object is being added by a user to a schematic according to the present embodiments.

FIG. 8 illustrates a scenario where an additional object is being added by a user to the schematic 100. In particular, the user drags and drops the additional circuit object 802 to replace the portion of the first interconnect 106a between the second interconnect 106b and the third interconnect 106c. The EDA tool can automatically determine whether the dimension A1 of the additional circuit object 802 is greater than the space S1. If A1 is greater than S1, the EDA tool can determine that an inflation of the schematic 100 can be invoked. The EDA tool can iteratively and/or automatically inflate the schematic 100 using a fixed scaling factor until the space S1 is sufficiently greater than the dimension A1 of the additional circuit object 802, for example. Alternatively, EDA tool can determine the scaling factor based on a ratio of a space S1' needed to sufficiently accommodate the additional circuit object 802 and the current space S1, and use the determined scaling factor to inflate the schematic 100.

Figure 9:
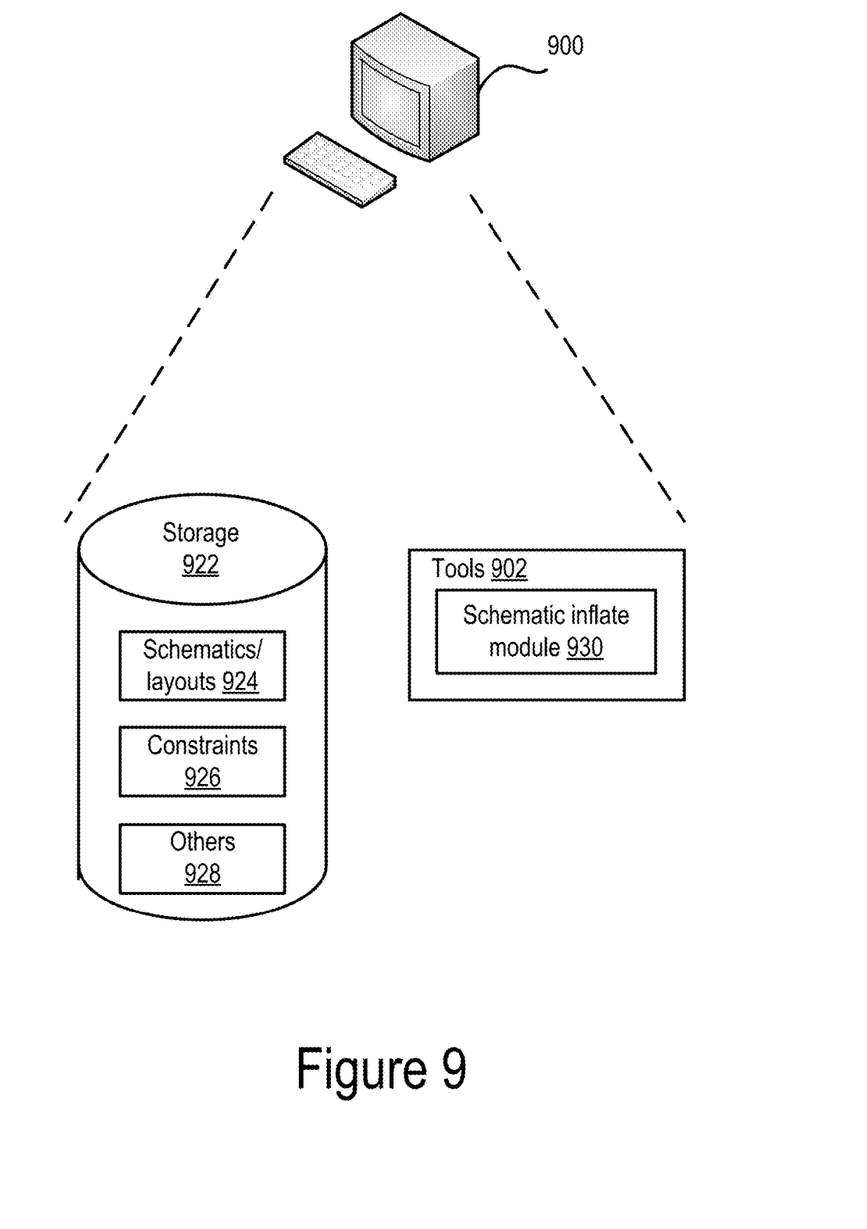
FIG. 9 is a functional block diagram illustrating an example system according to the present embodiments.

FIG. 9 is a functional block diagram of an example system for using place-as-schematic circuit cell placement in an integrated circuit design according to the present embodiments. In some embodiments, the system 900 can be one or more computers that are loaded with software (e.g., EDA tools) and/or customized to include hardware for interactively and/or automatically implementing designs of integrated circuits (e.g., ASICs, SOCs, full custom digital ICs). In some embodiments, the one or more computing systems 900 comprise various components not shown such as processor(s) or processor core(s), memory, disks, etc. The software and/or custom hardware may include interactive or automated modules such as a placer, a routing engine, a layout editor, a wire editor, a design rule checker, a verification engine, a module generator, and/or a floor-planner, as will be appreciated by those skilled in the art.

In one or more embodiments, the computing system 900 may further write to and read from a local or remote volatile or non-volatile computer accessible storage 922 that stores thereon data or information such as, but not limited to, one or more databases such as post-placement layouts, schematic design database(s) or physical design database(s) 924 (e.g., GDS II or OASIS data, etc.), libraries, rule decks, constraints (e.g., track specifications, minimum spacing, pitch/width requirements, widths, BCB rules), etc. 926, and/or other information or data 928 (e.g., trim shape locations) that may be required to support the methodology of the present embodiments. According to certain aspects, design rules in storage 926 are extendable or changeable (e.g., via APIs and the like) without changing other components or data in system 900.

In some embodiments, the one or more computing systems are implemented in a "cloud" configuration and/or a client/server configuration. For example, one or more server computers may be loaded with application software (e.g., a router and/or other EDA tool) for implementing some or all of the methodology of the present embodiments, and one or more client computers can communicate with the server computer(s) via a network to perform some or all of the methodology of the embodiments for a particular design.

In some embodiments, the one or more computing systems 900 may, by various standalone software, hardware modules or combinations thereof 902 (e.g., EDA tool), include a schematic inflate module 930 that inflates a schematic displayed on the GUI of the EDA tool. The schematic inflate module 930 can execute the process 200 discussed above in relation to FIG. 2. The inflate schematic module 930 may be implemented by adapting or communicating with certain pre-existing modules (e.g., placer, router, layout editor, design rule checker) as may be required to implement a methodology to implement design rule correct IC designs according to the present embodiments and as described above. Those skilled in the art will be able to understand how to implement various examples of such modules after being taught by the present disclosure.

Although the present embodiments have been particularly described with reference to preferred ones thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A method to reconfigure a schematic, comprising:
    displaying a schematic of a circuit on a graphical user interface of a computing device, the schematic comprising:
        a plurality of circuit objects, and
        at least one interconnect connecting the plurality of circuit objects to define a circuit connectivity;
    defining a schematic reference point on the schematic, the schematic reference point having coordinates defined in a coordinate system of the schematic;
    determining a distance within the coordinate system, of each circuit object of the plurality of circuit objects from the schematic reference point;
    increasing the distance within the coordinate system, of each circuit object of the plurality of circuit objects from the schematic reference point while maintaining a respective size of each circuit object within the coordinate system, wherein increasing the distance includes multiplying the distance by a scaling factor; and
    reconfiguring the at least one interconnect to maintain the circuit connectivity.

2. The method of claim 1, wherein increasing the distance of each circuit object of the plurality of circuit objects from the schematic reference point includes maintaining relative positions of each circuit object with respect to other circuit objects of the plurality of circuit objects.

3. The method of claim 1, wherein reconfiguring the at least one interconnect includes transforming at least one point on the at least one interconnect with the scaling factor.

4. The method of claim 3, wherein reconfiguring the at least one interconnect includes reconnecting the at least one interconnect to the plurality of circuit objects to maintain the circuit connectivity.

5. The method of claim 1, wherein determining the distance of each circuit object from the schematic reference point includes determining a circuit object reference point on each circuit object of the plurality of circuit objects, and determining the distance of each circuit object from the schematic reference point based on a distance between the circuit object reference point and the schematic reference point.

6. The method of claim 1, wherein the circuit object reference point on each circuit object coincides with a connection terminal of the circuit object.

7. The method of claim 1, further comprising:
    receiving a command to replace a first interconnect from the at least one interconnect with a first circuit object not belonging to the plurality of circuit objects;
    determining a first condition indicating that a dimension of the first circuit object is greater than a corresponding dimension of the first interconnect; and
    responsive to determining the first condition, increasing the distance of each circuit object of the plurality of circuit objects from the schematic reference point.

8. A computer readable storage medium having instructions stored thereon which when executed by a computer, cause the computer to execute a method to reconfigure a schematic, the method comprising:
    displaying a schematic of a circuit on a graphical user interface of a computing device, the schematic comprising:
        a plurality of circuit objects, and
        at least one interconnect connecting the plurality of circuit objects to define a circuit connectivity;
    defining a schematic reference point on the schematic, the schematic reference point having coordinates defined in a coordinate system of the schematic;
    determining a distance within the coordinate system, of each circuit object of the plurality of circuit objects from the schematic reference point;
    increasing the distance within the coordinate system, of each circuit object of the plurality of circuit objects from the schematic reference point while maintaining a respective size of each circuit object within the coordinate system, wherein increasing the distance includes multiplying the distance by a scaling factor; and
    reconfiguring the at least one interconnect to maintain the circuit connectivity.

9. The computer readable storage medium of claim 8, wherein increasing the distance of each circuit object of the plurality of circuit objects from the schematic reference point includes maintaining relative positions of each circuit object with respect to other circuit objects of the plurality of circuit objects.

10. The computer readable storage medium of claim 8, wherein reconfiguring the at least one interconnect includes transforming at least one point on the at least one interconnect with the scaling factor.

11. The computer readable storage medium of claim 10, wherein reconfiguring the at least one interconnect includes reconnecting the at least one interconnect to the plurality of circuit objects to maintain the circuit connectivity.

12. The computer readable storage medium of claim 8, wherein determining the distance of each circuit object from the schematic reference point includes determining a circuit object reference point on each circuit object of the plurality of circuit objects, and determining the distance of each circuit object from the schematic reference point based on a distance between the circuit object reference point and the schematic reference point.

13. The computer readable storage medium of claim 8, wherein the circuit object reference point on each circuit object coincides with a connection terminal of the circuit object.

14. The computer readable storage medium of claim 8, the method further comprising:
receiving a command to replace a first interconnect from the at least one interconnect with a first circuit object not belonging to the plurality of circuit objects;
determining a first condition indicating that a dimension of the first circuit object is greater than a corresponding dimension of the first interconnect; and
responsive to determining the first condition, increasing the distance of each circuit object of the plurality of circuit objects from the schematic reference point.

15. A system for implementing reconfiguration of a schematic comprising one or more processors, the one or more processors configured to:
display a schematic of a circuit on a graphical user interface of a computing device, the schematic comprising:
a plurality of circuit objects, and
at least one interconnect connecting the plurality of circuit objects to define a circuit connectivity;
define a schematic reference point on the schematic, the schematic reference point having coordinates defined in a coordinate system of the schematic;
determine a distance within the coordinate system, of each circuit object of the plurality of circuit objects from the schematic reference point;
increase the distance within the coordinate system, of each circuit object of the plurality of circuit objects from the schematic reference point while maintaining a respective size of each circuit object within the coordinate system, wherein to increase the distance includes to multiply the distance by a scaling factor; and
reconfigure the at least one interconnect to maintain the circuit connectivity.

16. The system of claim 15, wherein to increase the distance of each circuit object of the plurality of circuit objects from the schematic reference point includes to maintain relative positions of each circuit object with respect to other circuit objects of the plurality of circuit objects.

17. The system of claim 15, wherein to reconfigure the at least one interconnect includes to transform at least one point on the at least one interconnect with the scaling factor, and to reconnect the at least one interconnect to the plurality of circuit objects to maintain the circuit connectivity.

18. The system of claim 15, wherein to determine the distance of each circuit object from the schematic reference point includes to determine a circuit object reference point on each circuit object of the plurality of circuit objects, and to determine the distance of each circuit object from the schematic reference point based on a distance between the circuit object reference point and the schematic reference point.

19. The system of claim 15, wherein the circuit object reference point on each circuit object coincides with a connection terminal of the circuit object.

20. The system of claim 15, wherein the one or more processors are further configured to:
receive a command to replace a first interconnect from the at least one interconnect with a first circuit object not belonging to the plurality of circuit objects;
determine a first condition indicating that a dimension of the first circuit object is greater than a corresponding dimension of the first interconnect; and
responsive to the determination of the first condition, increase the distance of each circuit object of the plurality of circuit objects from the schematic reference point.

\* \* \* \* \*